(12) United States Patent
Ito et al.

(10) Patent No.: US 11,858,007 B2
(45) Date of Patent: Jan. 2, 2024

(54) OPTICAL GRANULAR MATTER SORTER (71) Applicant: SATAKE CORPORATION, Tokyo (JP)

(72) Inventors: Takafumi Ito, Tokyo (JP); Tadashi Matsushita, Tokyo (JP); Masaaki Sadamaru, Tokyo (JP)

(73) Assignee: SATAKE CORPORATION, Tokyo (JP)

( * ) Notice: Subject to any disclaimer, the term of this patent is extended or adjusted under 35 U.S.C. 154(b) by 128 days.

(21) Appl. No.: 17/638,090

(22) PCT Filed: Apr. 13, 2020

(86) PCT No.: PCT/JP2020/016253
§ 371 (c)(1),
(2) Date: Feb. 24, 2022

(87) PCT Pub. No.: WO2021/038948
PCT Pub. Date: Mar. 4, 2021

(65) Prior Publication Data
US 2022/0297162 A1 Sep. 22, 2022

(30) Foreign Application Priority Data

Aug. 27, 2019 (JP) ................................. 2019-154297

(51) Int. Cl.
B07C 5/342 (2006.01)
B07C 5/36 (2006.01)

(52) U.S. Cl.
CPC ............ B07C 5/3425 (2013.01); B07C 5/361 (2013.01)

(58) Field of Classification Search
CPC ....... B07C 5/3425; B07C 5/361; B07C 5/368; B07C 5/342; B07C 2501/0018; B07C 5/36; B07C 5/366; B07C 5/363; B07C 5/365
(Continued)

(56) References Cited

U.S. PATENT DOCUMENTS 5,779,058 A * 7/1998 Satake .................... B07C 5/368
250/226
6,100,488 A * 8/2000 Satake .................. B07C 5/3425
209/580
(Continued)

FOREIGN PATENT DOCUMENTS

CN 101198411 A 6/2008
CN 103561877 A 2/2014
(Continued)

OTHER PUBLICATIONS

Chinese Office Action dated Feb. 11, 2023 in Application No. 2020800597995, with English-language translation.

Primary Examiner — Gene O Crawford
Assistant Examiner — Muhammad Awais
(74) Attorney, Agent, or Firm — Faegre Drinker Biddle & Reath LLP (57) ABSTRACT To provide an optical grain sorter that can reduce the proportion of non-defective grains blown off collaterally, and even in a case in which a plurality of defective grains or the like fall down in a state overlapping each other, can blow off all the defective grains or the like.

The optical granular matter sorter includes a control unit configured to control an ejection time of a compressed gas from an air ejecting unit based on a result of detection obtained by an optical detecting unit, in which the control unit has a comparing unit configured to compare a defect detection time for an object to be sorted by the optical (Continued)

detecting unit and a single-granular matter passage set time set in advance, and a calculating unit configured to multiply the defect detection time by a predetermined coefficient based on a result of comparison obtained by the comparing unit to calculate the ejection time, and in a case in which the defect detection time is less than or equal to the single-granular matter passage set time as the result of comparison obtained by the comparing unit, the calculating unit multiplies the defect detection time by a small coefficient as compared to a case in which the defect detection time exceeds the single-granular matter passage set time to calculate the ejection time, and controls the ejection time of the compressed gas from the air ejecting unit based on a result of calculation.

4 Claims, 4 Drawing Sheets

(58) Field of Classification Search
USPC .......................................... 209/44; 700/223
See application file for complete search history.

(56) References Cited

U.S. PATENT DOCUMENTS

| | | | |
|---|---|---|---|
| 6,721,465 B1 | 4/2004 | Nakashima et al. | |
| 7,360,750 B2* | 4/2008 | Yano | F16K 31/004 |
| | | | 251/129.01 |
| 9,024,223 B2* | 5/2015 | Miyamoto | G01N 21/27 |
| | | | 209/580 |
| 9,833,815 B2* | 12/2017 | Gruna | B07C 5/342 |
| 10,197,978 B2* | 2/2019 | Mills | F16K 31/02 |
| 2009/0050540 A1* | 2/2009 | Imai | G01N 21/85 |
| | | | 209/580 |
| 2011/0284431 A1* | 11/2011 | Ito | F16K 31/004 |
| | | | 209/552 |
| 2013/0081982 A1* | 4/2013 | Tanaka | G01N 21/85 |
| | | | 209/552 |
| 2014/0061103 A1 | 3/2014 | Ito et al. | |
| 2014/0339141 A1* | 11/2014 | Ito | B07C 5/366 |
| | | | 209/552 |

FOREIGN PATENT DOCUMENTS

| | | | | |
|---|---|---|---|---|
| CN | 108108679 A | * | 6/2018 | ........... B07C 5/3425 |
| CN | 109460951 A | | 3/2019 | |
| CN | 109692822 A | * | 4/2019 | ............. B07C 5/342 |
| CN | 110090818 A | * | 8/2019 | ............. B07C 5/342 |
| EP | 1083007 A2 | * | 3/2001 | ........... B07C 5/3425 |
| EP | 2907592 A1 | * | 8/2015 | ............. B07C 5/342 |
| JP | H06-41876 U | | 6/1994 | |
| JP | H0641876 U | * | 6/1994 | |
| JP | H11-179292 A | | 7/1999 | |
| JP | 2000157936 A | * | 6/2000 | |
| JP | 2001-272353 A | | 10/2001 | |
| JP | 2004-122111 A | | 4/2004 | |
| JP | 2011-241961 A | | 12/2011 | |
| JP | 2017/080732 A | | 5/2017 | |
| JP | 2017080732 A | * | 5/2017 | |
| JP | 2017-176896 A | | 10/2017 | |
| TW | 468331 B | | 12/2001 | |
| WO | WO-2006/071859 A2 | | 7/2006 | |
| WO | WO-2019111785 A1 | * | 6/2019 | ............. B07C 5/368 |

* cited by examiner

| VALVE OPEN TIME c (ms) | SOLENOID VALVE EJECTION TIME a (ms) | PIEZOELECTRIC VALVE EJECTION TIME b (ms) |
|---|---|---|
| 0.35 | - | 0.32 |
| 0.40 | - | 0.38 |
| 0.45 | - | 0.43 |
| 0.50 | 0.18 | 0.48 |
| 0.60 | 0.25 | 0.60 |
| 0.70 | 0.35 | 0.70 |
| 0.80 | 0.50 | 0.80 |
| 0.90 | 0.60 | 0.90 |
| 1.00 | 0.75 | 1.00 |

[FIG. 6]

OPTICAL GRANULAR MATTER SORTER

CROSS REFERENCE TO RELATED APPLICATIONS

This application is a National Stage of International Application No. PCT/JP2020/016253, filed Apr. 13, 2020, and claims the benefit of Japanese Patent Application No. 2019-154297, filed Aug. 27, 2019, the entire contents of each of which are incorporated herein by reference.

TECHNICAL FIELD

The present invention relates to an optical granular matter sorter that blows off defective granular matters or the like with ejected air to sort granular matters.

BACKGROUND ART

A conventionally known optical granular matter sorter sorts granular matters into non-defective granular matters and defective granular matters by blowing off granular matters, such as grains or resin pellets, with ejected air, and removes foreign matters or the like mixed in the granular matters with ejected air.

This type of granular matter sorter sorts granular matters falling from an end part of a conveyor path along a predetermined trajectory by blowing off and removing a defective granular matter or the like with ejected air in response to a detection signal indicating that the defective granular matter or the like has been detected (see Patent Literature 1).

In an optical granular matter sorter described in Patent Literature 1, an air ejection time is set in proportion to a value of a width of the detection signal indicating that the defective granular matter has been detected. This optical granular matter sorter can reduce the amount of air consumption as a whole as compared with a case in which the air ejection time is constant. In addition, this optical granular matter sorter can reduce the proportion of non-defective granular matters blown off collaterally with defective granular matters.

However, if the ratio of the air ejection time to a defective granular matter detection time is reduced, the granular matter sorter described in Patent Literature 1 may not be able to blow off all the defective granular matters or the like in a case in which a plurality of defective granular matters or the like fall down in a state overlapping one another and in a case of blowing off the plurality of defective granular matters or the like in response to a single defective granular matter detection signal. If the ratio of the air ejection time to the defective granular matter detection time is increased, the proportion of non-defective granular matters blown off collaterally with defective granular matters when blowing off the defective granular matters or the like is increased.

CITATION LIST

Patent Literature

[Patent Literature 1] Japanese Patent Laid-Open No. 11-179292

SUMMARY OF INVENTION

Technical Problem

The present disclosure therefore has an object to provide an optical granular matter sorter that can reduce the proportion of non-defective granular matters blown off collaterally with defective granular matters, and even in a case in which a plurality of defective granular matters or the like fall down in the state overlapping one another, can blow off all the defective granular matters or the like.

Solution to Problem

To achieve the above object, the present disclosure provides an optical granular matter sorter including: a conveyor configured to convey an object to be sorted; an optical detecting unit configured to detect, at a detection position, the object to be sorted falling from an end part of the conveyor; an air ejecting unit disposed below the optical detecting unit, and configured to blow off the object to be sorted with ejected air of a compressed gas based on a result of detection obtained by the optical detecting unit; and a control unit configured to control an ejection time of the compressed gas from the air ejecting unit based on the result of detection obtained by the optical detecting unit.

The control unit has a comparing unit configured to compare a defect detection time for the object to be sorted by the optical detecting unit and a single-granular matter passage set time set in advance, and a calculating unit configured to multiply the defect detection time by a predetermined coefficient based on a result of comparison obtained by the comparing unit to calculate the ejection time. In a case in which the defect detection time is less than or equal to the single-granular matter passage set time as the result of comparison obtained by the comparing unit, the calculating unit multiplies the defect detection time by a small coefficient as compared to a case in which the defect detection time exceeds the single-granular matter passage set time to calculate the ejection time, and controls the ejection time of the compressed gas from the air ejecting unit based on a result of calculation.

Herein, the single-granular matter passage set time corresponds to a time (a single-granular matter passage time) detected while a single granular matter which is the object to be sorted passes (falls down) through the detection position, and can be set in advance in accordance with the object to be sorted.

In the present disclosure, preferably, in a case in which the defect detection time is less than or equal to the single-granular matter passage set time as the result of comparison obtained by the comparing unit, the calculating unit multiplies the defect detection time by a coefficient of more than or equal to 0.5 and less than 1.0 as the small coefficient to calculate the ejection time, and the control unit controls the ejection time of the compressed gas from the air ejecting unit based on the result of the calculation.

In the present disclosure, preferably, the comparing unit compares a calculated value calculated by multiplying the defect detection time by the small coefficient and a minimum ejection set time which is shorter than the single-granular matter passage set time and set in advance, and in a case in which the calculated value is less than the minimum ejection set time, the control unit controls the ejection time of the compressed gas from the air ejecting unit based on the minimum ejection set time.

Herein, the minimum ejection set time is a minimum air ejection time that enables the object to be sorted to be blown off, and can be set in advance in accordance with the object to be sorted.

In the present disclosure, preferably, the air ejecting unit includes a piezoelectric valve configured to open and close the valve utilizing a displacement of a piezoelectric element, the piezoelectric valve has a gas pressure chamber configured to receive a compressed gas supplied from outside and a gas discharge channel through which the compressed gas is configured to be discharged from the gas pressure chamber, the piezoelectric valve further has a valve body, disposed in the gas pressure chamber and configured to open and close the gas discharge channel, the piezoelectric element configured to produce a driving force required to move the valve body as a displacement, and a displacement enlarging mechanism configured to enlarge the displacement of the piezoelectric element, the displacement acting on the valve body, and a voltage is applied to the piezoelectric element to expand the piezoelectric element and open the valve body.

Advantageous Effects of Invention

In the optical granular matter sorter of the present disclosure, the control unit has a comparing unit configured to compare a defect detection time for the object to be sorted by the optical detecting unit and a single-granular matter passage set time set in advance, and a calculating unit configured to multiply the defect detection time by a predetermined coefficient based on a result of comparison obtained by the comparing unit to calculate an ejection time. In addition, in the optical granular matter sorter of the present disclosure, in a case in which the defect detection time is less than or equal to the single-granular matter passage set time as the result of comparison obtained by the comparing unit, the calculating unit multiplies the defect detection time by a small coefficient as compared to a case in which the defect detection time exceeds the single-granular matter passage set time to calculate the ejection time. In addition, in the optical granular matter sorter of the present disclosure, the control unit controls the ejection time of the compressed gas from the air ejecting unit based on the result of calculation. Therefore, in the case in which the defect detection time is less than or equal to the single-granular matter passage set time, the proportion of non-defective granular matters blown off collaterally with defective granular matters when blowing off the defective granular matters or the like can be reduced by reducing the ratio of the air ejection time to the defect detection time. In addition, in the case in which the defect detection time exceeds the single-granular matter passage set time, the ratio of the air ejection time to the defect detection time is increased to ensure the air ejection time. Thus, even in a case in which a plurality of defective granular matters or the like fall down in a state overlapping one another, all the defective granular matters or the like can be blown off.

In the optical granular matter sorter of the present disclosure, in the case in which the defect detection time is less than or equal to the single-granular matter passage set time as the result of comparison obtained by the comparing unit, the calculating unit multiplies the defect detection time by a coefficient of more than or equal to 0.5 and less than 1.0 as the small coefficient to calculate the ejection time, and the control unit controls the ejection time of the compressed gas from the air ejecting unit based on the result of the calculation. In the optical granular matter sorter of the present disclosure, the proportion of non-defective granular matters blown off collaterally with defective granular matters when blowing off the defective granular matters or the like can be reduced by making the ratio of the air ejection time to the defect detection time as small as more than or equal to 0.5 and less than 1.0. In addition, in the case in which the defect detection time exceeds the single-granular matter passage set time, the ratio of the air ejection time to the defect detection time is made larger than in the case in which the defect detection time is less than or equal to the single-granular matter passage set time to ensure the air ejection time. Thus, even in the case in which a plurality of defective granular matters or the like fall down in the state overlapping one another, all the defective granular matters or the like can be blown off.

In the optical granular matter sorter of the present disclosure, the comparing unit compares a calculated value calculated by multiplying the defect detection time by the small coefficient and a minimum ejection set time which is shorter than the single-granular matter passage set time and set in advance, and in the case in which the calculated value is less than the minimum ejection set time, the control unit controls the ejection time of the compressed gas from the air ejecting unit based on the minimum ejection set time. With such a configuration, the minimum air ejection time required to blow off the object to be sorted is ensured even in a case in which a defect of the object to be sorted is small. Thus, defective granular matters or the like can be reliably blown off.

In the optical granular matter sorter of the present disclosure, the air ejecting unit includes a piezoelectric valve configured to open and close the valve utilizing a displacement of a piezoelectric element, the piezoelectric valve has a gas pressure chamber configured to receive a compressed gas supplied from outside and a gas discharge channel through which the compressed gas is configured to be discharged from the gas pressure chamber, the piezoelectric valve further has a valve body, disposed in the gas pressure chamber and configured to open and close the gas discharge channel, the piezoelectric element configured to produce a driving force required to move the valve body as a displacement, and a displacement enlarging mechanism configured to enlarge the displacement of the piezoelectric element, the displacement acting on the valve body, and a voltage is applied to the piezoelectric element to expand the piezoelectric element and open the valve body. With such a configuration, the air ejection time can be shorter than in a conventional optical granular matter sorter including an air ejecting unit in which a solenoid valve is utilized because the piezoelectric valve is superior in responsivity when opening and closing the valve, and only defective granular matters can be blown off accurately without non-defective granular matters blown off collaterally.

DESCRIPTION OF EMBODIMENT

An embodiment of the present disclosure will be described with reference to the drawings.

Figure 1:
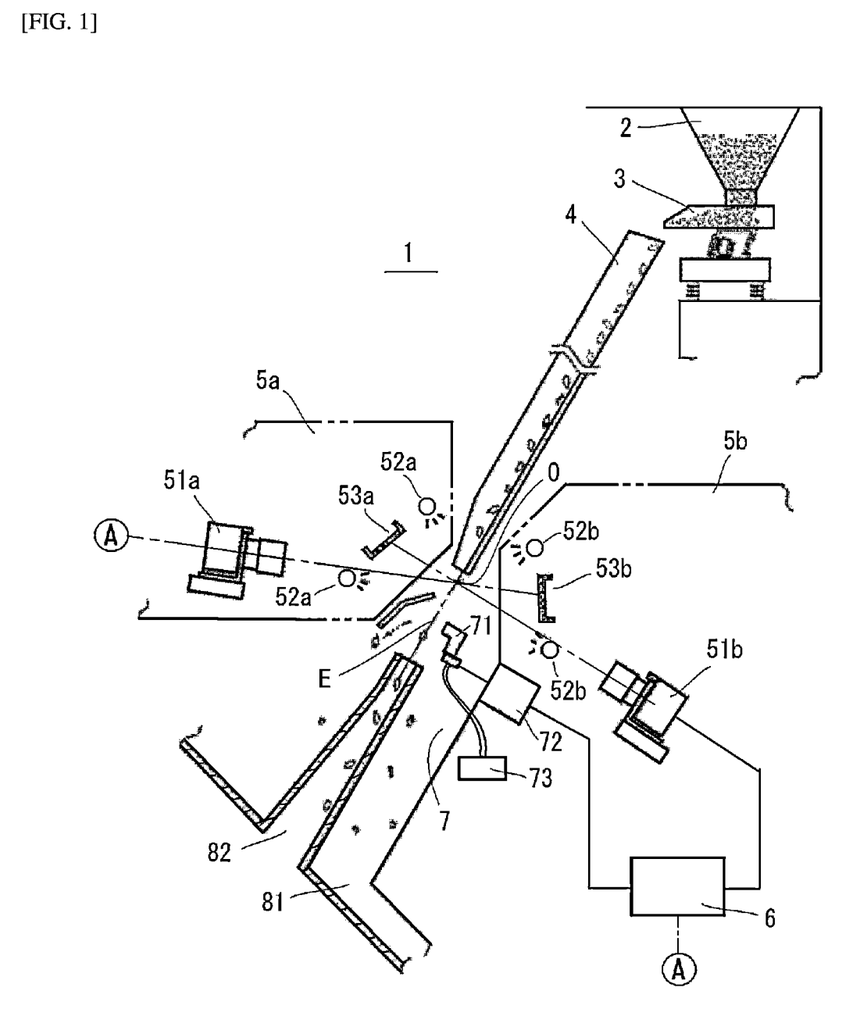
FIG. 1 is a side cross-sectional view of essential part of an optical granular matter sorter in which a piezoelectric valve is utilized.
Figure 2:
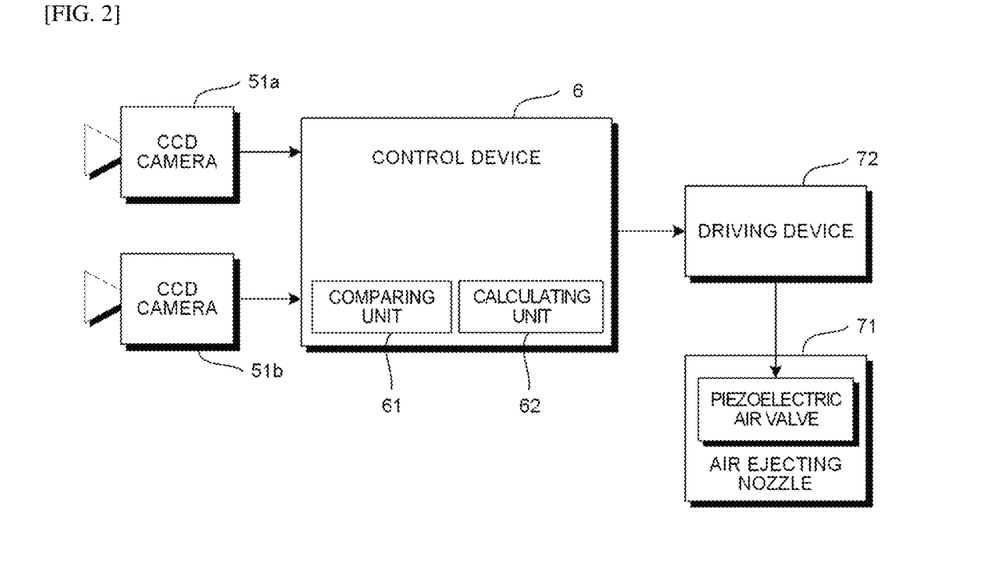
FIG. 2 is a control block diagram of the optical granular matter sorter shown in FIG. 1.

FIG. 1 shows a side cross-sectional view showing a simplified inner structure of an optical granular matter sorter 1. FIG. 2 shows a control block of the optical granular matter sorter.

The optical granular matter sorter 1 has a granular matter supply unit at the top thereof, the granular matter supply unit including a tank 2 and a vibrating feeder 3. An inclined chute 4 having a predetermined width is disposed below the granular matter supply unit.

Granular matters supplied from the granular matter supply unit are spread over the entire width of the inclined chute 4 and continuously flow down by gravity, and then are thrown into the air along a predetermined falling trajectory from the lower end of the inclined chute 4.

At least a pair of optical detecting devices 5a and 5b are disposed in front of and behind the predetermined falling trajectory so as to face each other. The optical detecting devices 5a and 5b capture images of the granular matters at a granular matter detection position O that linearly extends in parallel with the width direction of the inclined chute 4. The optical detecting devices 5a and 5b include imaging units 51a and 51b, such as CCD cameras including CCD line sensors, illuminating units 52a and 52b implemented by an LED or the like, and background units 53a and 53b that serve as a background when imaging the granular matters, respectively, for example.

In addition, an air ejecting device 7 that removes defective granular matters, foreign matters, or the like (hereinafter referred to as "defective granular matters or the like") with ejected air is disposed below the granular matter detection position O. The air ejecting device 7 includes an air ejecting nozzle 71 including a plurality of piezoelectric valves which will be described later arranged in parallel with each other, a driving device 72 that opens and closes the piezoelectric valves included in the air ejecting nozzle 71, and a compressed air supplying device 73 that supplies compressed air to the air ejecting nozzle 71. Based on the detection result from each of the optical detecting devices 5a and 5b, the air ejecting device 7 selectively drives the piezoelectric valves to open, and blows off the granular matters thrown from the lower end of the inclined chute 4 by ejecting air from the plurality of nozzle holes of the air ejecting nozzle 71 arranged in correspondence to the respective positions of falling trajectories of the granular matters in the width direction. Note that the piezoelectric element of the piezoelectric valve is electrically connected to a driving circuit of the driving device 72.

In the optical granular matter sorter 1 described above, the granular matters spread over the inclined chute 4 in the width direction, continuously flown down by gravity, and then thrown into the air along the predetermined falling trajectory from the lower end of the inclined chute 4 are imaged at the granular matter detection position O by the imaging units 51a and 51b of the optical detecting devices 5a and 5b. The imaging data is transmitted to a control device 6.

The control device 6 specifies a granular matter to be removed, such as a defective granular matter, based on the imaging data. The control device 6 acquires information concerning the size of the granular matter, information concerning the size of a defect of the granular matter, or the like, and transmits a signal for removal of the defective granular matter or the like to the driving device 72.

Based on the signal for removal transmitted to the driving device 72, the air ejecting device 7 selectively drives the plurality of piezoelectric valves at a predetermined time. The air ejecting device 7 ejects air to the defective granular matters or the like that pass through a granular matter removal position E that linearly extends in parallel with the width direction of the inclined chute 4 from the nozzle holes of the air ejecting nozzle 71 provided in correspondence to the respective positions in the width direction.

The defective granular matters or the like blown off by the ejected air from the respective nozzle holes of the air ejecting nozzle 71 are discharged to the outside through a defective granular matter discharge port 81. The non-defective granular matters or the like that have passed along the predetermined falling trajectory without being blown off the ejected air are collected through a non-defective granular matter discharge port 82.

In an embodiment of the present disclosure, the control device 6 has a comparing unit 61 that compares a defect detection time t for imaging data and a single-granular matter passage set time t1 set in advance, and a calculating unit 62 that calculates an air ejection time based on a comparison result obtained by the comparing unit 61.

Herein, the single-granular matter passage set time t1 corresponds to a time (a single-granular matter passage time) detected when a single granular matter passes (falls down) through the granular matter detection position O, and can be set in advance in accordance with the target to be sorted.

In an embodiment of the present disclosure, in a case in which the defect detection time t is shorter than or equal to the single-granular matter passage set time t1 ($t \leq t1$) as a result of the comparison between the defect detection time t and the single-granular matter passage set time t1 in the comparing unit 61, a defect-including granular matter is regarded as a single granular matter. In a case in which the defect detection time t exceeds the single-granular matter passage set time t1 ($t > t1$), the defect-including granular matter shall be regarded as multiple granular matters.

Then, the calculating unit 62 multiplies the defect detection time t by coefficients different between the case of regarding the defect-including granular matter as a single granular matter and the case of regarding the defect-including granular matter as multiple granular matters to calculate air ejection times.

The control device 6 transmits the signal for removal of defective granular matters or the like to the driving device 72 based on the result of calculation obtained by the calculating unit 62 to control the time and the like for ejecting air from the air ejecting device 7.

Figure 3:
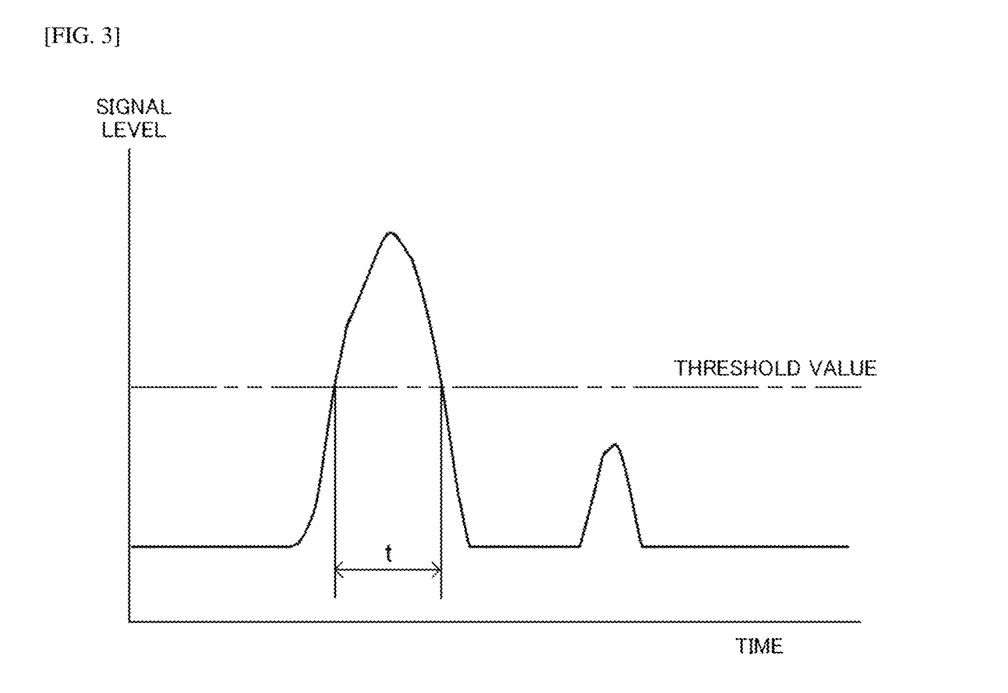
FIG. 3 is a waveform graph of an output signal of imaging data in an optical detecting device.

FIG. 3 shows a waveform graph of an output signal of imaging data of the imaging units in the optical detecting device.

The control device 6 compares the output signal of imaging data in the imaging units 51a and 51b with a threshold value to detect a defective portion, and acquires the defect detection time t.

Herein, in an embodiment of the present disclosure, the defect means, for example, a defective portion (including the entirety) such as damaged grains, dead rice, colored grains, or immature grains in a case in which the granular matters are rice grains. In a case of a foreign matter, the defect means the entirety thereof.

In an embodiment of the present disclosure, in the case of regarding the defect-including granular matter as a single granular matter as a result of the comparison obtained by the comparing unit 61, the control device 6 multiplies the defect detection time t by, for example, a coefficient of more than or equal to 0.5 and less than 1.0, preferably a coefficient of more than or equal to 0.6 and less than 0.8, and more preferably a coefficient of approximately 0.7 in the calculating unit 62 to calculate the air ejection time. In the case of regarding the defect-including granular matter as multiple granular matters as a result of the comparison obtained by the comparing unit 61, the control device 6 multiplies the defect detection time t by a coefficient of, for example, more than or equal to 1.0 and less than 1.5, preferably a coefficient of 1.0, which is larger than that in the case of regarding the defect-including granular matter as a single granular matter, in the calculating unit 62 to calculate the air ejection time.

In the case of regarding the defect-including granular matter as a single granular matter as a result of the comparison obtained by the comparing unit 61, by multiplying the defect detection time t by, for example, a coefficient of more than or equal to 0.5 and less than 1.0, preferably a coefficient of more than or equal to 0.6 and less than 0.8, and more preferably a coefficient of approximately 0.7 in the calculating unit 62 to calculate the air ejection time, the ratio of the air ejection time to the defect detection time t is reduced. Thus, the proportion of non-defective granular matters blown off collaterally with defective granular matters or the like when blowing off the defective granular matters or the like can be reduced. In addition, the amount of air consumption can be reduced.

In addition, in the case of regarding the defect-including granular matter as multiple granular matters as a result of the comparison obtained by the comparing unit 61, by multiplying the defect detection time t by, for example, a coefficient of more than or equal to 1.0 and less than 1.5, and preferably a coefficient of 1.0, which is larger than in the case of regarding the defect-including granular matter as a single granular matter, in the calculating unit 62 to calculate the air ejection time, the ratio of the air ejection time to the defect detection time t is increased to ensure the air ejection time. Thus, even in a case in which a plurality of defective granular matters or the like fall down in a state overlapping one another, all the defective granular matters or the like can be blown off.

In an embodiment of the present disclosure, in the case of regarding the defect-including granular matter as a single granular matter as a result of the comparison obtained by the comparing unit 61, the control device 6 further compares in the comparing unit 61 a calculated value calculated by multiplying the defect detection time t by the coefficient for the case of regarding the defect-including granular matter as a single granular matter and a minimum ejection set time t2 which is shorter than the single-granular matter passage set time t1 and set in advance, and in a case in which the calculated value is less than the minimum ejection set time t2, the minimum ejection set time t2 can be determined as the ejection time.

Herein, the minimum ejection set time t2 is the minimum air ejection time that enables granular matters to be blown off, and can be set in advance in accordance with the target to be sorted.

By configuring the comparing unit 61 to compare the calculated value and the minimum ejection set time t2 which is shorter than the single-granular matter passage set time t1 and set in advance, and in the case in which the calculated value is less than the minimum ejection set time t2, determine the minimum ejection set time t2 as the ejection time, the minimum air ejection time required to blow off the granular matters can be ensured even in a case in which the defect of the defective granular matters or the like is small. This enables the defective granular matters or the like to be blown off reliably.

In an embodiment of the present disclosure, in the case of regarding the defect-including granular matter as a single granular matter as a result of the comparison obtained by the comparing unit 61, the control device 6 is configured to further compare, in the comparing unit 61, the calculated value calculated by multiplying the defect detection time t by the coefficient for the case of regarding the defect-including granular matter as a single granular matter and the minimum ejection set time t2 which is shorter than the single-granular matter passage set time t1 and set in advance. However, in the comparing unit 61, the calculated value calculated by multiplying the defect detection time t by the coefficient for the case of regarding the defect-including granular matter as a single granular matter and the minimum ejection set time t2 can be compared at a stage before comparing the defect detection time t and the single-granular matter passage set time t1.

In that case, in a case in which the calculated value calculated by multiplying the defect detection time t by the coefficient for the case of regarding the defect-including granular matter as a single granular matter is longer than the minimum ejection set time t2, the defect detection time t and the single-granular matter passage set time t1 are compared, and the defect detection time t is multiplied by a predetermined coefficient to calculate the air ejection time.

Figure 4:
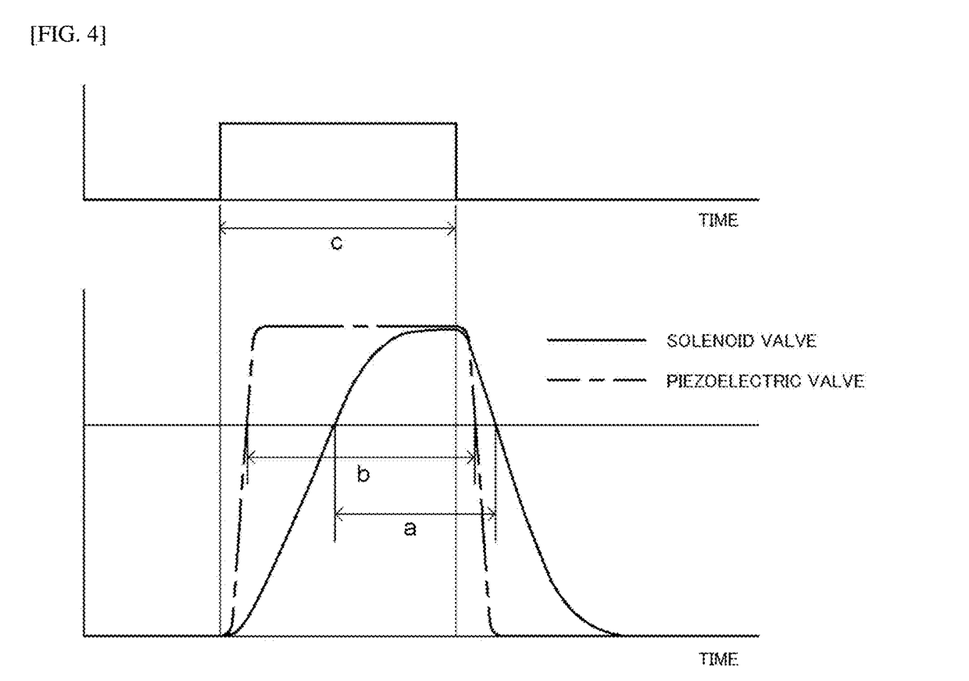
FIG. 4 is a schematic explanatory diagram showing air ejection characteristics of a solenoid valve and a piezoelectric valve for comparison.

FIG. 4 is a schematic explanatory diagram showing air ejection characteristics of a solenoid valve and a piezoelectric valve for comparison.

In FIG. 4, the upper diagram shows ON/OFF of an air ejection signal for driving the valve included in the air ejecting nozzle to open/close (in the case of the driving device 72, an input signal to the driving circuit for displacing the piezoelectric element by expansion/contraction), while the lower diagram shows an example of an air ejection pressure associated with opening/closing of the valve.

As shown in FIG. 4, in the case of the solenoid valve, there is a large delay in rising/falling of the air ejection pressure in response to ON/OFF of the air ejection signal, whereas in the case of the piezoelectric valve, there is little delay in rising/falling of the air ejection pressure, and the piezoelectric valve is significantly superior to the solenoid valve in responsivity when opening/closing the valve.

Note that FIG. 4 shows a valve open time (air ejection signal ON time) c, an air ejection time a for the solenoid valve during which an air ejection pressure is more than or equal to p at which defective granular matters or the like can be removed reliably, and an air ejection time b for the piezoelectric valve during which the air ejection pressure is more than or equal to p.

Figure 5:
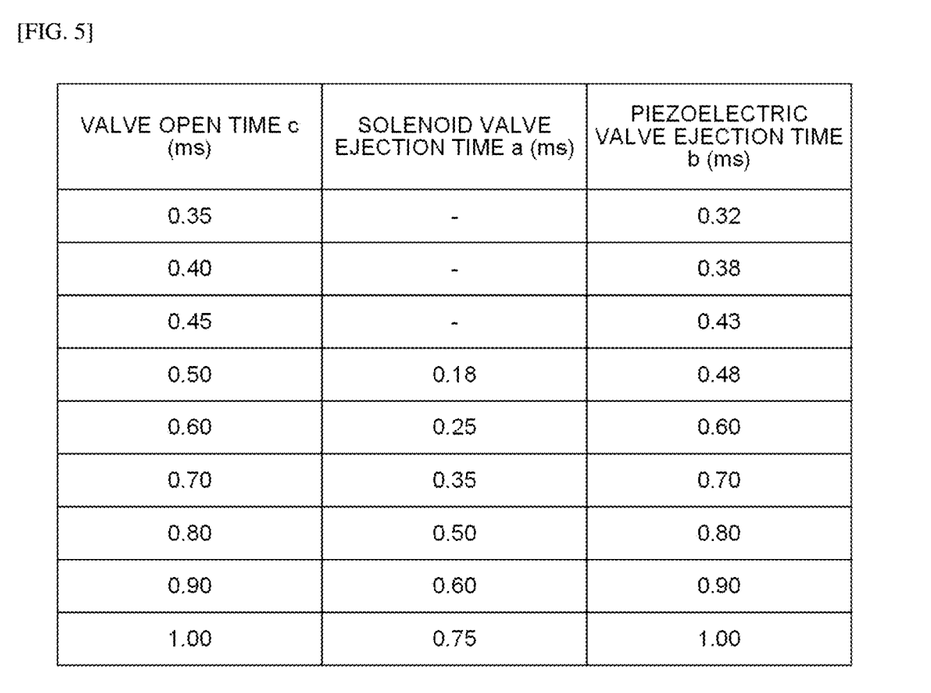
FIG. 5 is a table showing response performance of the solenoid valve and the piezoelectric valve for comparison.

FIG. 5 shows an example of response performance of the solenoid valve and the piezoelectric valve for comparison, and shows a table in which the respective air ejection times a, b and the valve open time c in FIG. 4 are compared.

As shown in FIG. 5, in the case of the solenoid valve, the valve open time c is 0.50 (ms) to 1.00 (ms), and the air ejection time a is 0.18 (ms) to 0.75 (ms). As the valve open time c is shorter, the proportion of the air ejection time a to the valve open time c decreases. When the valve open time c is less than or equal to 0.45 (ms), the air ejection time a is zero.

On the other hand, in the case of the piezoelectric valve, the valve open time c is 0.35 (ms) to 1.00 (ms), and the air ejection time b is 0.32 (ms) to 1.00 (ms). The valve open time c and the air ejection time b substantially agree to each other.

In the example shown in FIG. 5, the piezoelectric valve can ensure a time for removal of defective granular matters or the like which is substantially the same degree as in the solenoid valve with a valve open time approximately 0.5 to 0.8 times that of the solenoid valve.

The above-described optical granular matter sorter 1 includes the air ejecting nozzle in which the piezoelectric valve is utilized, and supply of air can be stabilized promptly. This enables granular matters to be sorted more stably in cooperation with good responsivity when opening the valve.

In the above-described optical granular matter sorter, granular matters targeted for sorting are representatively cereal grains, in particular, rice grains, but are not necessarily limited to cereal grains. The target may be anything that has a size and mass that can be blown off with ejected air.

The piezoelectric valve will now be described.

Figure 6:
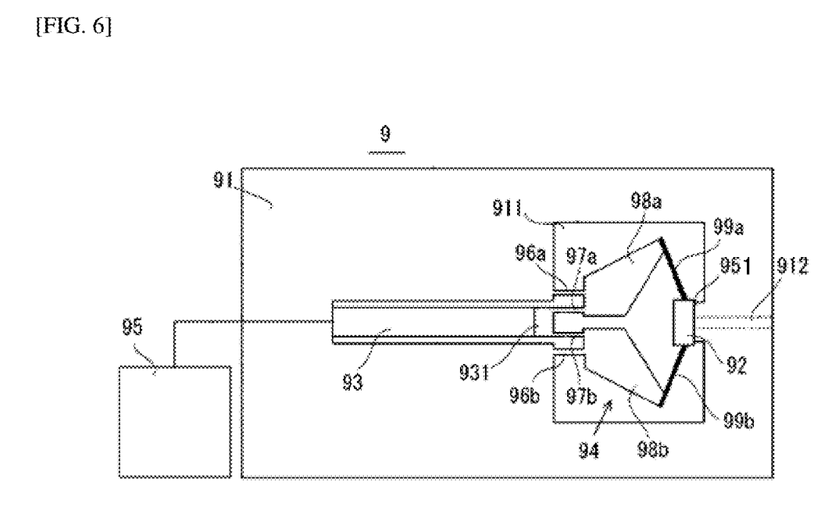
FIG. 6 is a schematic explanatory diagram of the piezoelectric valve.

FIG. 6 is a schematic explanatory diagram of the piezoelectric valve in a state in which a side surface of a valve main body is opened, showing the side surface when the valve is closed.

The piezoelectric valve 9 includes a valve main body 91, a valve body 92, a piezoelectric element 93, displacement enlarging mechanisms 94, and a driving device 95.

The valve main body 91 has a gas pressure chamber 911 that receives a compressed gas supplied from an external compressed gas supply source (not shown), and a gas discharge channel 912 that ejects the gas in the gas pressure chamber 911 to the outside.

The valve body 92 is disposed in the gas pressure chamber 911 in the valve main body 91, and opens and closes the gas discharge channel 912.

The piezoelectric element 93 is disposed in the valve main body 91, and has one end fixed to the valve main body 91.

The displacement enlarging mechanisms 94 are disposed in the gas pressure chamber 911 in the valve main body 91, and enlarge displacement of the piezoelectric element 93 so as to be acted on the valve body 92.

The driving device 95 includes a charging driving circuit that applies a driving voltage to the piezoelectric element 93 to store electric charge to expand the piezoelectric element 93, and a discharging driving circuit that discharges the stored electric charge to contract the piezoelectric element 93. The driving device 95 displaces the piezoelectric element 93 by expansion and contraction, thereby driving the valve body 92 to open and close.

Note that the driving device 95 may be any driving device in which both the driving circuits are electrically connected to the piezoelectric element, and does not always have to be physically integrated with the valve main body 91, for example.

The displacement enlarging mechanisms 94 are a pair of displacement enlarging mechanisms that are disposed symmetrically with respect to a line that connects the longitudinal axis of the piezoelectric element 93 and the gas discharge channel 912 (hereinafter referred to as a "center line").

A first displacement enlarging mechanism includes a first hinge 96a, a second hinge 97a, a first arm member 98a, and a first leaf spring 99a. The first hinge 96a has one end coupled to the valve main body 91. The second hinge 97a has one end coupled to a cap member 931 attached to the piezoelectric element 93. The first hinge 96a and the second hinge 97a have the other ends coupled to a base part of the first arm member 98a. The first leaf spring 99a has one end coupled to an outer leading end portion of the first arm member 98a. The first leaf spring 99a has the other end coupled to one side end part of the valve body 92.

On the other hand, a second displacement enlarging mechanism includes a third hinge 96b, a fourth hinge 97b, a second arm member 98b, and a second leaf spring 99b. The third hinge 96b has one end coupled to the valve main body 91. The fourth hinge 97b has one end coupled to the cap member 931 attached to the piezoelectric element 93. The third hinge 96b and the fourth hinge 97b have the other ends coupled to a base part of the second arm member 98b. The second leaf spring 99b has one end coupled to an outer leading end portion of the second arm member 98b. The second leaf spring 99b has the other end coupled to the other side end part of the valve body 92.

In the piezoelectric valve 9, when the driving device 95 applies a voltage to the piezoelectric element 93 in the state of FIG. 6, the piezoelectric element 93 expands in the rightward direction in the drawing. The first displacement enlarging mechanism enlarges a displacement of the piezoelectric element 93 through expansion by the principle of leverage with the second hinge 97a serving as a point of power, the first hinge 96a serving as a fulcrum, and the leading end portion of the first arm member 98a serving as a point of action, thereby largely displacing the outer leading end portion of the first arm member 98a. Similarly, the second displacement enlarging mechanism enlarges a displacement of the piezoelectric element 93 through expansion by the principle of leverage with the fourth hinge 97b serving as a point of power, the third hinge 96b serving as a fulcrum, and the leading end portion of the second arm member 98b serving as a point of action, thereby largely displacing the outer leading end portion of the second arm member 98b.

The displacements of the first arm member 98a and the second arm member 98b at the respective outer leading end portions cause the valve body 92 to separate from a valve seat 951 via the first leaf spring 99a and the second leaf spring 99b, thereby opening the gas discharge channel 912.

On the other hand, when application of the voltage to the above-described piezoelectric element 93 by the driving device 95 is canceled in the piezoelectric valve 9, the piezoelectric element 93 contracts, and the contraction is transferred to the valve body 92 via the first and second displacement enlarging mechanisms, and the valve body 92 seats on the valve seat 951.

The structure of the above-described piezoelectric valve is not limited to that shown in FIG. 6 as long as the piezoelectric valve includes the valve main body having the gas pressure chamber that receives supply of a compressed gas from the compressed gas supply source and the gas discharge channel that ejects the gas in the gas pressure chamber to the outside, the valve body disposed in the gas pressure chamber and opening/closing the gas discharge channel, the piezoelectric element disposed in the valve main body, and having one end fixed to the valve main body, and the displacement enlarging mechanisms disposed in the gas pressure chamber and enlarging displacements of the piezoelectric element so as to be acted on the valve body.

The optical granular matter sorter in the above-described embodiment of the present disclosure includes the air ejecting nozzle 71 including the piezoelectric valve having excellent responsivity when opening/closing the valve, but may include the air ejecting nozzle 71 including a solenoid valve instead of the piezoelectric valve.

The present disclosure is not limited to the above embodiment, but can obviously be modified as appropriate in its configuration within the scope of the disclosure.

INDUSTRIAL APPLICABILITY

The optical granular matter sorter of the present disclosure is highly useful in that the proportion of non-defective granular matters blown off collaterally with defective granular matters can be reduced, and even in a case in which a plurality of defective granular matters or the like fall down in a state overlapping one another, all the defective granular matters or the like can be blown off.

REFERENCE SIGNS LIST 1 optical granular matter sorter
4 inclined chute
5a, 5b optical detecting device
51a, 51b CCD camera (imaging unit)
6 control device
61 comparing unit
62 calculating unit
7 air ejecting device
71 air ejecting nozzle
72 driving device
73 compressed air supplying device
9 piezoelectric valve
91 valve main body
911 gas pressure chamber
912 gas discharge channel
92 valve body
93 piezoelectric element
94 displacement enlarging mechanism
95 driving device
951 valve seat
98a, 98b arm member
99a, 99b leaf spring
a air ejection time for solenoid valve during which air ejection pressure is more than or equal to p
b air ejection time for piezoelectric valve during which air ejection pressure is more than or equal to p
c valve open time (air ejection signal ON time)
p air ejection pressure at which defective granular matters or the like can be removed reliably
t defect detection time

The invention claimed is:

1. An optical granular matter sorter comprising:
conveying means configured to convey an object to be sorted;
an optical detecting unit configured to detect, at a detection position, the object to be sorted falling from an end part of the conveying means;
an air ejecting unit disposed below the optical detecting unit, and configured to blow off the object to be sorted with ejected air of a compressed gas based on a result of detection obtained by the optical detecting unit; and
a control unit configured to control an ejection time of the compressed gas from the air ejecting unit based on the result of detection obtained by the optical detecting unit, wherein the control unit comprises:
a comparing unit configured to compare a defect detection time for the object to be sorted by the optical detecting unit and a single-granular matter passage set time set in advance, and
a calculating unit configured to multiply the defect detection time by a predetermined coefficient based on a result of comparison obtained by the comparing unit to calculate the ejection time, and
in a case in which the defect detection time is less than or equal to the single-granular matter passage set time as the result of comparison obtained by the comparing unit, the calculating unit multiplies the defect detection time by a small coefficient as compared to a case in which the defect detection time exceeds the single-granular matter passage set time to calculate the ejection time, and controls the ejection time of the compressed gas from the air ejecting unit based on a result of calculation.

2. The optical granular matter sorter according to claim 1, wherein in a case in which the defect detection time is less than or equal to the single-granular matter passage set time as the result of comparison obtained by the comparing unit, the calculating unit multiplies the defect detection time by a coefficient of more than or equal to 0.5 and less than 1.0 as the small coefficient to calculate the ejection time, and the control unit controls the ejection time of the compressed gas from the air ejecting unit based on the result of the calculation.

3. The optical granular matter sorter according to claim 1, wherein the comparing unit compares a calculated value calculated by multiplying the defect detection time by the small coefficient and a minimum ejection set time which is shorter than the single-granular matter passage set time and set in advance, and in a case in which the calculated value is less than the minimum ejection set time, controls the ejection time of the compressed gas from the air ejecting unit based on the minimum ejection set time.

4. The optical granular matter sorter according to claim 1, wherein
the air ejecting unit includes a piezoelectric valve configured to open and close the valve utilizing a displacement of a piezoelectric element,
the piezoelectric valve has a gas pressure chamber configured to receive a compressed gas supplied from outside and a gas discharge channel through which the compressed gas is configured to be discharged from the gas pressure chamber,
the piezoelectric valve further has a valve body, disposed in the gas pressure chamber and configured to open and close the gas discharge channel, the piezoelectric element configured to produce a driving force required to move the valve body as a displacement, and a displacement enlarging mechanism configured to enlarge the displacement of the piezoelectric element so as to be acted on the valve body, and
a voltage is applied to the piezoelectric element to expand the piezoelectric element and open the valve body.

* * * * *